United States Patent Office 3,117,768
Patented Jan. 14, 1964

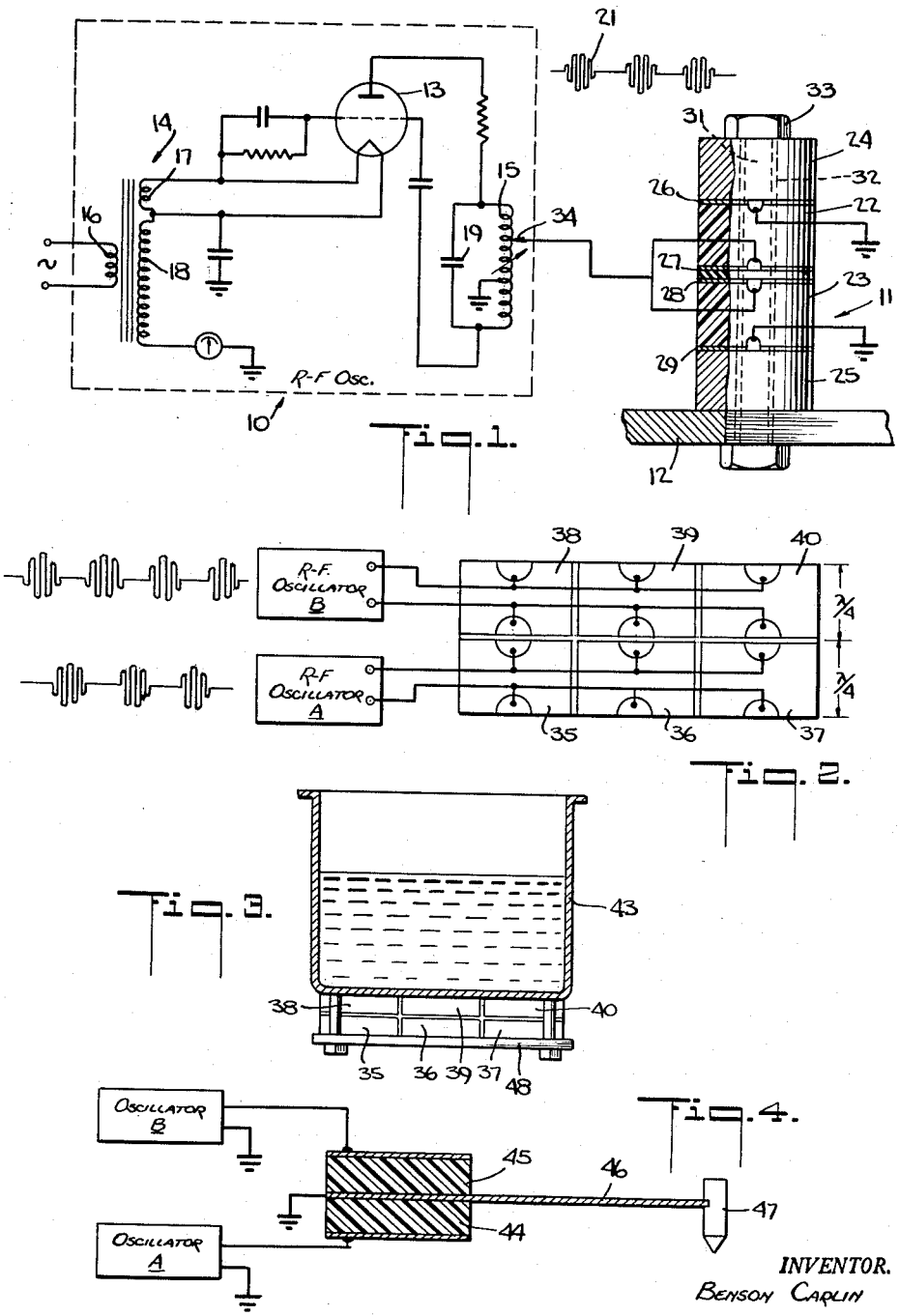

3,117,768
ULTRASONIC TRANSDUCERS
Benson Carlin, Fair Lawn, N.J., assignor, by mesne assignments, to Branson Instruments, Incorporated, a corporation of Connecticut
Filed Nov. 21, 1960, Ser. No. 70,486
4 Claims. (Cl. 259—72)

The present invention relates generally to ultrasonic systems, and more particularly to improved barium titanate transducers for such systems.

High amplitude acoustic waves have been employed in a variety of applications involving gases, liquids and solids. Holes or gas bubble cavities can be created in a liquid by high-intensity ultrasonic waves. This process, called cavitation, may be used to disperse metals and sulphur in solutions, to produce extra fine grain photographic emulsions and in the uniform alloying of molten metals. Ultrasonic energy is also used widely in the cleaning and degreasing of metal parts, the large acoustic forces acting to break off particles and contaminants from metal surfaces.

Another application for ultrasonic energy is in testing. Ultrasonic inspectoscopes are adapted to transmit sound waves into a solid piece and to determine the presence of flaws by reflections or by an interruption of the sound wave transmission through the piece. Such ultrasonic inspection devices are effective in sensing the presence of defects in metals, glasses and ceramics and they have also been applied in the inspection of automobile tires.

In ultrasonic operations, it is often useful to be able to apply very high powers to the material being activated or irradiated. The most commonly used generator for ultrasonic energy employs ferromagnetic ceramics, such as barium titanate. Barium titanate behaves as an electrostrictive piezoelectric transducer which converts radio-frequency energy into ultrasonic waves.

Barium titanate is generally molded in block form as a plastic which is then treated to render it piezoelectric. Such blocks usually come in 2 x 2 x 1 inch sizes, the 2 x 2 inch faces being plated with silver to provide electrodes. The radio-frequency voltage is impressed across the silvered electrodes and the barium titanate is thereby caused to expand and contract.

Conventional transducers of the barium titanate type are limited in their output by the amount of power which can be accommodated by the barium titanate itself. Thus, if the amount of radio-frequency power applied to a given barium titanate block is doubled, the amount of ultrasonic power generated will not necessarily be doubled, for beyond a certain power level internal heating becomes quite severe and the efficiency of the transducer is reduced substantially.

It is known to use barium titanate blocks in the form of combinations or sandwiches in which the titanate block is bonded to a metal block acting as part of the transducer and also as a coupling medium. The value of using metal is that the "Q" of metal is high, thereby affording good efficiency. Moreover, metal is less fragile and is cheaper than titanate and the frequency can be made much lower than with titanate alone. It is the common practice to bond the metal to either one or both sides of the titanate block, the overall dimension of the resultant sandwich determining the operating frequency of the transducer. However, such transducers are also limited in their output by the amount of power which can be accommodated by the barium titanate itself.

Accordingly, it is the main object of the present invention to provide barium titanate transducers of increased efficiency and power.

More particularly, it is an object of the invention to provide high-power composite barium transducers which may be readily tuned and which may be electrically isolated from their environment.

Also an object of the invention is to provide composite barium titanate transducers of high power which are particularly suited for ultrasonic testing, cleaning and welding applications.

Briefly stated, these objects are attained in a barium titanate transducer constituted by a composite stack of titanate elements which are bonded together each element having its own pair of electrodes whereby the element may be individually activated, the several elements providing a combined vibratory action of increased power output.

For a better understanding of the invention as well as other objects and further features thereof, reference is had to the following detailed description to be read in conjunction with the accompanying drawing wherein:

FIG. 1 is a sectional view of a preferred embodiment of a composite barium titanate transducer in accordance with the invention, the transducer being energized by a radio-frequency oscillator, shown schematically.

FIG. 2 shows, in section, another preferred embodiment of a composite transducer according to the invention.

FIG. 3 illustrates one method for securing the transducer shown in FIG. 2 to a cleaning tank.

FIG. 4 shows a composite transducer in accordance with the invention for activating a welding tip.

Referring now to FIG. 1, there is shown an ultrasonic system in accordance with the invention comprising a radio-frequency generator, generally designated by numeral 10, and a composite barium titanate transducer 11. The transducer is bolted to a device to be activated, which in practice may be a metal tank 12 containing a cleaning solution. It will be appreciated that the composite transducer may be used in any known ultrasonic application. It is also to be understood that the invention is not limited to barium titanate elements and that other piezoelectric materials may be used.

Generator 10 includes a triode vacuum tube 13 in combination with a power transformer 14 and an oscillatory tank coil 15. Transformer 14 is provided with a primary winding 16 connected to the A.-C. power line, a low-voltage winding 17 connected to the filament of triode 13 and a high-voltage secondary 18 connected between one end of the filament winding and ground through an ammeter 20. Tank coil 15 is shunted by a condenser 19 to provide a parallel-resonant circuit which is coupled between the anode and grid of the triode 13. Coil 15 is grounded at a tap point.

The circuit operates as a Hartly oscillator, tube 13 also serving to half-wave rectify the high voltage from the secondary of the power transformer. Thus radio-frequency oscillations, as shown by waveform 21, are produced during the half-wave cycles in which the anode of tube 13 is positive relative to filament.

The composite transducer 11 is constituted by two like barium titanate blocks 22 and 23 sandwiched between two metal blocks 24 and 25. The frequency of the transducer is determined by its overall width, as is common with other combined transducers. The opposing faces of each of the titanate blocks is metallized or silver-plated to provide end electrodes for exciting the blocks, and tabs are extended from the electrodes over the edges of the blocks to facilitate connection to the electrodes without getting in between the block and the material to which it is bonded.

Thus titanate block 22 is provided with a pair of electrodes 26 and 27 and titanate block 23 with electrodes 28 and 29. The two titanate blocks are bonded together, preferably with epoxy cement 30 which affords insulation therebetween. The titanate blocks are also bonded to the metal blocks 24 and 25, and the combination is secured to plate 12 by a bolt 31 extending through an insulation bushing 32, the bolt threadably receiving a tightening nut 33. The configuration of the composite blocks may be cylindrical or square, as desired. While two titanate blocks are stacked in the composite transducer, it is to be understood that a greater number of blocks may be included and individually excited.

The high-voltage output tap 34 on the tank coil of the R-F generator is connected to the adjacent electrodes 27 and 28 of titanate blocks 22 and 23, whereas the outer electrodes 26 and 29 are grounded. Thus the "hot" side of the R-F power is connected within the composite transducer while the "cold" side is connected to the grounded metal end blocks. It is safe therefore to attach the metal blocks directly to the tank or device being activated, since these blocks are grounded and electrically isolated from the high-voltage.

It will be evident that the output of the R-F generator is applied both across titanate block 22 and across titanate block 23, the blocks vibrating in opposing directions to provide an additive effect. The available R-F power is distributed between the two titanate blocks to minimize undue heating and to improve the efficiency of the transducer. The composite transformer may be readily tuned by tightening or loosening the nut 33. This is of advantage since, in practice, small variations in frequency are encountered in titanate blocks and matching of a pair of blocks is very difficult.

Referring now to FIG. 2, there is shown another embodiment of the invention wherein the transducer comprises a first bank of three barium titanate blocks 35, 36 and 37 bonded together in side-by-side relation by epoxy cement or other insulation material. The first bank of blocks is bonded in face-to-face relation by epoxy cement to a face plate which, instead of the customary metal, consists also of a bank of barium titanate blocks 38, 39 and 40. The frequency of the transducer is set by the overall width of the structure, each bank having a quarter-wave length width.

The advantage of this transducer is that if power from a R-F oscillator A is applied to the set of blocks 35, 36 and 37, we can now connect another oscillator B to the set of face plate titanate blocks 38, 39 and 40. In practice, both generators may use unrectified power, as in the case of FIG. 1, and operate from a 60 cycle power line. Thus during each 1/60 of a second during which the A.-C. is going positive, as represented by wave shape 41, the set of blocks 35, 36 and 37 will be activated.

If now generator B is operated out of phase with generator A, blocks 38, 39 and 40 will be activated, as shown by wave shape 42 in the half-cycle intervals during which the other bank is inactive. Thus the entire transducer will operate at 120 cycles, and the average power will be twice as high as in a normal generator, giving twice as much power into the cleaning bath without any additional heating. During the "off" time, the bank of blocks which is not being activated acts exactly like the metal face plate or passive parts of the composite transducers with respect to the bank of blocks which is being activated during the "on" time of its associated R-F generator.

The composite titanate transducer structure shown in FIG. 2 may be bonded by epoxy cement to the base of a stainless steel cleaning tank 43 as shown in FIG. 3, and may also be bolted thereto by means of a yoke arrangement 48. Thus when the transducer is activated in the manner disclosed above, each set of titanate blocks is alternately passive and active, and twice as much energy may be introduced as compared to the same width in conventional titanate blocks.

Referring now to FIG. 4, there is shown a composite transducer adapted to apply ultrasonic energy to a welding tip 47. The composite transducer is constituted by a pair of barium titanate blocks 44 and 45 bonded to opposing sides of a metal plate 46. Plate 46 is connected to the tip 47 laterally and transmits a flexural wave thereto in response to the vibratory action of the titanate blocks.

To excite the blocks, the center plate is grounded, the radio-frequency voltage from oscillator A being applied between the outer electrode of titanate block 44 and ground, while the radio-frequency voltage from oscillator B is applied between the outer electrode of titanate block 45 and ground. It will be seen that the hot sides of the radio-frequency power is at the ends of the composite transducer, rather than in the center as in FIG. 1. But since it is the grounded center which is connected to the workpiece, this arrangement is clearly preferable. The operation of the transducer otherwise is similar to that disclosed in FIG. 2.

It will be seen that with composite transducers of the type disclosed herein, for a given combined width of barium titanate elements it is possible to apply greatly increased power without overheating as compared to the equivalent width of a conventional titanate element.

While there have been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. An ultrasonic transducer system comprising first and second banks of barium titanate blocks bonded together in side-by-side relation, the blocks having electrodes coated thereon on opposing faces thereof, the blocks of the first bank being bonded by an insulation layer in face-to-face relation to the blocks of the second bank, means to apply a first radio-frequency voltage between the opposing electrodes of the blocks in the first bank, and means to apply a second radio-frequency voltage between the opposing electrodes of the blocks in the second bank.

2. A transducer system, as set forth in claim 1, wherein the first and second radio-frequency voltages are constituted by periodic half-wave power line frequency pulses in phase opposition to each other whereby the blocks in one bank are active while the blocks in the other bank are passive.

3. An ultrasonic cleaning system comprising a metal tank for containing a cleaning fluid, and an ultrasonic transducer secured to the base of said tank and including first and second banks of barium titanate blocks bonded together in side-by-side relation, the blocks having electrodes coated thereon on opposing faces thereof, the blocks of the first bank being bonded by an insulation material in face-to-face relation to the blocks of the second bank, the block of the second bank being facially bonded to the base of said tank, and a yoke further securing said first and second banks to said tank.

4. A system, as set forth in claim 3, further including first and second radio-frequency oscillators producing half-wave pulses of radio-frequency energy in phase opposition, and means to apply the respective outputs of said oscillators to the electrodes of said first and second banks to excite same whereby each of said banks is alternately active and passive.

References Cited in the file of this patent

UNITED STATES PATENTS

| | | |
|---|---|---|
| 2,222,906 | Hentzer | Nov. 26, 1940 |
| 2,472,179 | Tibbetts | June 7, 1949 |
| 2,815,193 | Brown | Dec. 3, 1957 |
| 2,826,396 | Murdoch | Mar. 11, 1958 |
| 2,836,737 | Crownover | May 27, 1958 |
| 2,851,877 | Joy | Sept. 16, 1958 |
| 2,891,176 | Branson | June 16, 1959 |
| 2,895,061 | Probus | July 14, 1959 |
| 2,930,912 | Miller | Mar. 29, 1960 |
| 2,977,572 | Pope | Mar. 28, 1961 |
| 3,066,232 | Branson | Nov. 27, 1962 |